F. M. COCKRELL, Jr.
SUGAR CANE STRIPPER AND TOPPER.
APPLICATION FILED NOV. 11, 1912.

1,118,636.

Patented Nov. 24, 1914.

F. M. COCKRELL, Jr.
SUGAR CANE STRIPPER AND TOPPER.
APPLICATION FILED NOV. 11, 1912.

1,118,636.

Patented Nov. 24, 1914.
4 SHEETS—SHEET 4.

WITNESSES:

INVENTOR

BY

ATTORNEY

UNITED STATES PATENT OFFICE.

FRANCIS M. COCKRELL, JR., OF KANSAS CITY, MISSOURI, ASSIGNOR TO COCKRELL MANUFACTURING COMPANY, LIMITED, OF NEW ORLEANS, LOUISIANA, A CORPORATION OF LOUISIANA.

SUGAR-CANE STRIPPER AND TOPPER.

1,118,636. Specification of Letters Patent. Patented Nov. 24, 1914.

Application filed November 11, 1912. Serial No. 730,640.

*To all whom it may concern:*

Be it known that I, FRANCIS M. COCKRELL, Jr., a citizen of the United States, residing at Kansas City, county of Jackson, and State of Missouri, have invented certain new and useful improvements in Sugar-Cane Strippers and Toppers, of which the following is a specification.

This invention relates to sugar cane strippers and toppers.

The object of the present invention is the provision of an improved and novel sugar cane stripper and topper which will satisfactorily and successfully accomplish the work of stripping and topping under any and all of the varying conditions involved in harvesting sugar cane, and with this end in view, the invention consists, first, in novel means adapted to both strip the leaves from the stalks and advance them after they have been severed; second, novel means adapted for arranging or adjusting the stalks of varying lengths so that they may be topped at any desired and uniform distance from their upper ends; third, novel means for topping the adjusted stalks; fourth, novel combined stripping and conveying means combined in a new manner with novel stalk adjusting means and with topping means, whereby the growing cane on being severed is automatically stripped of its leaves and conveyed into the machine by the stripping mechanism, is afterward adjusted to insure topping of the stripped stalks at any desired and uniform distance from their upper ends and is conveyed to the topping means by the joint action of the stripping means and the adjusting means; further, in various improved and novel instrumentalities which are fully set forth hereinafter and recited in the appended claims, an embodiment of the complete invention being shown in the accompanying drawings, in which—

Figure 1:
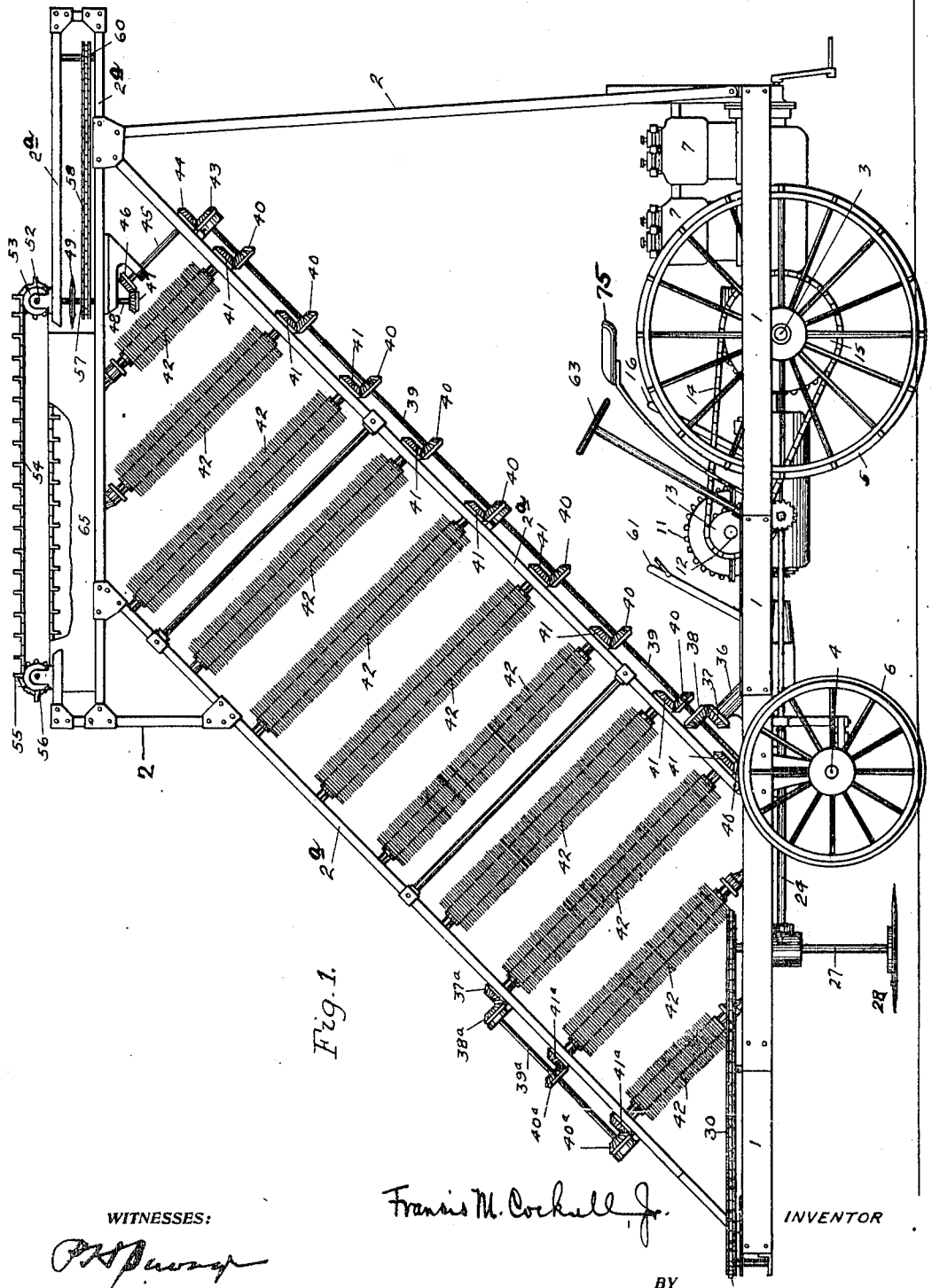
Figure 2:
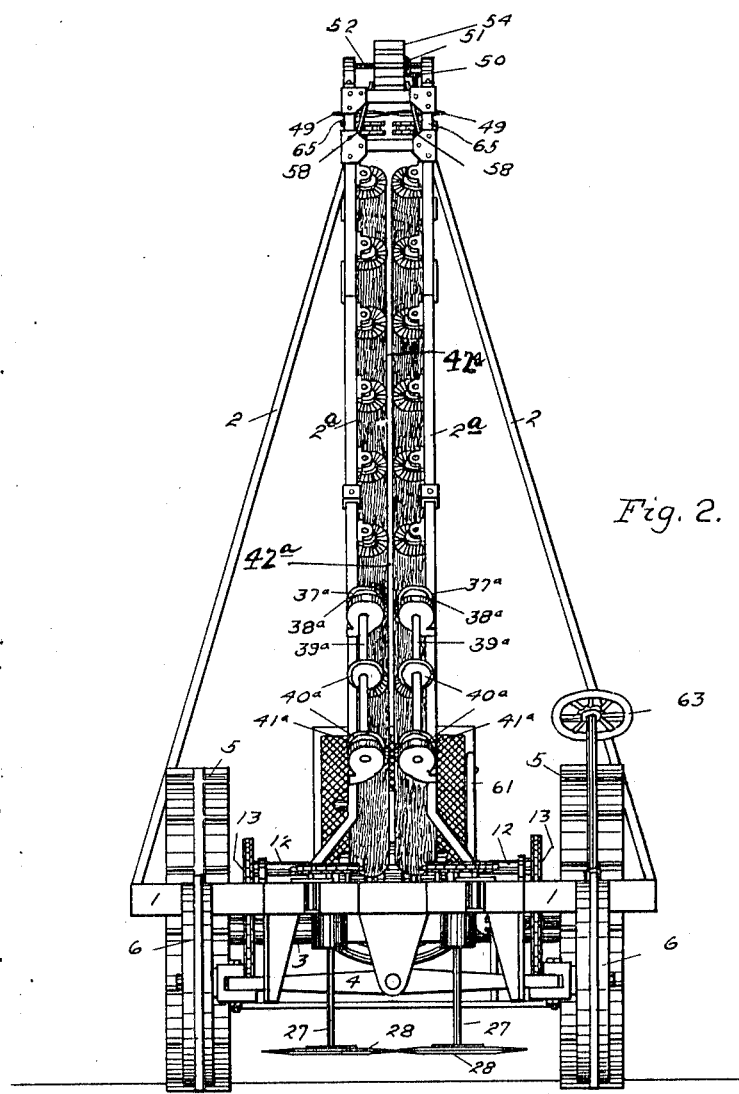
Figure 3:
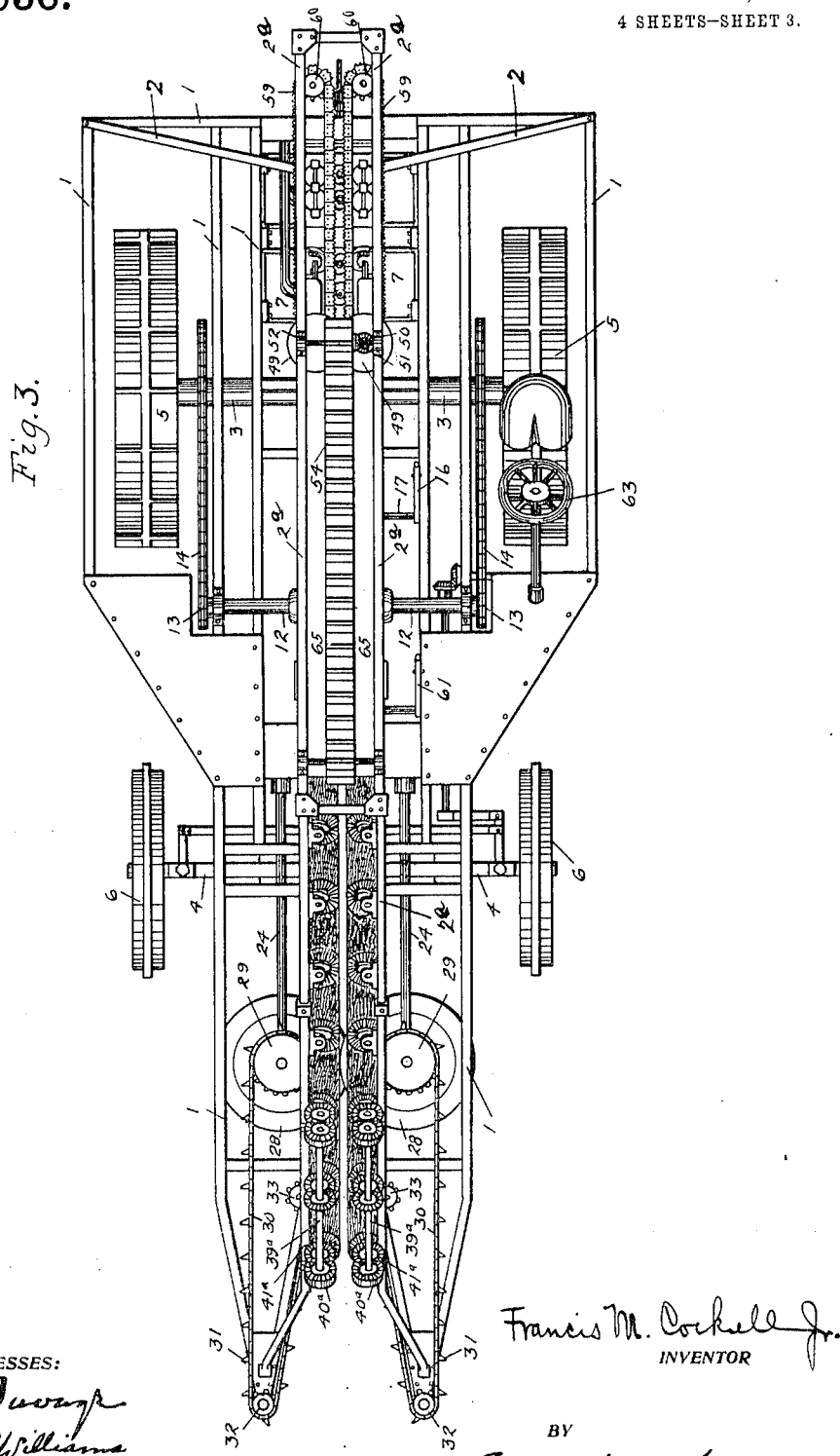

Figure 1 is a side elevation; Fig. 2, a front elevation; Fig. 3, a top plan view; and Fig. 4, a bottom plan view.

The main frame 1 is surmounted by a superstructure 2 and is supported on axles 3 and 4 having, respectively, rear traction wheels 5 and front steering wheels 6, the latter being mounted in any preferred manner for steering purposes. The steering wheels 6 may be turned by a suitable hand steering wheel 63 placed conveniently for the operator, and suitable arms, levers, shafts and connecting rods 64 of any preferred or usual design.

Figure 4:
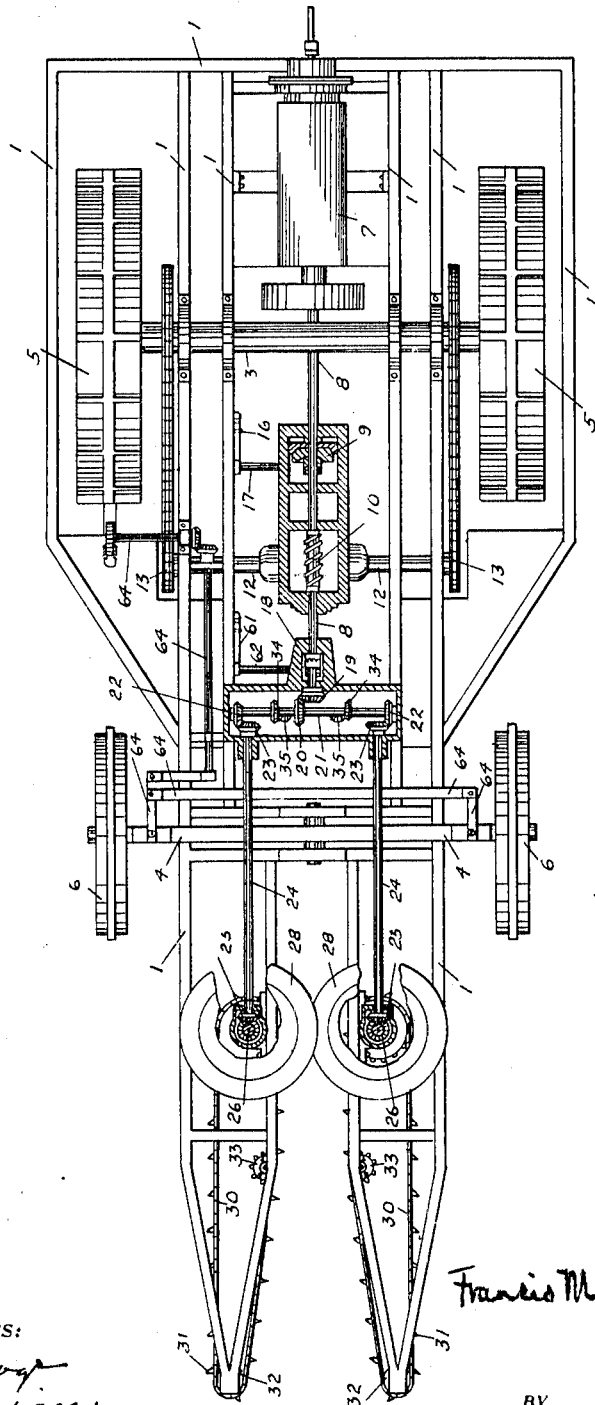

While any suitable source of power may be employed for propelling and operating the machine, I have found it desirable to use an internal combustion engine 7 having a power shaft 8 extending longitudinally of the machine and provided with a clutch 9 of any approved construction. The shaft 8 carries a worm 10 which meshes with and is adapted to drive a worm gear 11 (Fig. 1) on a suitably mounted countershaft 12, countershaft 12 being provided on its end parts with sprocket wheels 13 which, through the medium of sprocket chains 14, drive sprocket wheels 15 attached to the hubs of the traction wheels 5, whereby the machine is propelled, under the control of clutch 9 by a lever 16 on rocker shaft 17 (Fig. 3). The shaft 8 has another clutch 18 for coupling it to a short shaft which carries a bevel gear 19. A rocker shaft 62 and a hand lever 61 afford means for controlling the clutch 18, and as the bevel gear 19 drives the cutting, stripping, adjusting and topping mechanisms, the lever 61 affords means for quickly and simultaneously starting or stopping them. Suitably journaled in the frame 1 is a countershaft 21 which carries bevel gears 20, 22 and 34, the gear 20 meshing with gear 19. The gears 22 mesh with bevel gears 23 on horizontal shafts 24 for driving the stalk cutters and the drawing-in mechanism. The bevel gears 34 mesh with bevel gears 35 on shafts 36 which are provided with bevel gears 37 meshing with bevel gears 38 on shafts 39 for driving the stripping, stalk-adjusting, topping and discharge mechanisms. On the forward ends of shaft 24 are bevel pinions 25 meshing in bevel gears 26 on vertically arranged shafts 27 which carry circular stalk cutters 28 placed opposite each other with their edges slightly overlapping (Fig. 4). Carried by the upper ends of shafts 27 are sprocket wheels 29 (Fig. 3) which drive the forwardly extending endless conveyer chains 30 having projections or fingers 31 at intervals of their lengths and which also run around idler sprockets 32 and 33 at the extreme forward ends of the bifurcated front receiving part of the machine frame 1. The forward stretches of the chains 30 converge inwardly and then run parallel (Fig. 4), enabling the fingers on the chains to properly draw in the growing sugar cane and to direct it to the cutters 28.

The superstructure 2 has a part 2ª composed of upper and lower pairs of parallel frame members arranged at an angle, it may be 45°, more or less, to the horizontal. Journaled in suitable bearings on this framework 2ª and arranged angularly thereto and to the horizontal, preferably at 45°, more or less, to the horizontal, are the shafts of cylindrical wire stripping brushes 42, which shafts have bevel gears meshing with bevel gears 40 on shaft 39. The stripping brushes 42 are arranged in pairs, the brushes of each pair being opposite with their axes preferably parallel and the axes of all of the brushes being parallel to each other. The brushes, preferably, do not touch each other, leaving a narrow gap 42ª (Figs. 2 and 3) between the brushes of all of the pairs. The two lowermost pairs of brushes 42 are provided with bevel gears 41ª meshing with bevel gears 40ª on a shaft 39ª suitably mounted on frame members 2ª and carrying a bevel gear 38ª meshing with a bevel gear 37ª on the third from the lowest of the pairs of brushes, whereby the two lowermost pairs of brushes 42 are driven. The lowermost pairs of brushes are disposed over the bifurcated part of front frame 1 so that they are adapted to coöperate with the growing cane and to commence to both strip the leaves therefrom and tend to bring the stalks to an upright position as they are pulled in by the chains 30, even before the cutters 28 have severed the stalks.

On the upper ends of shafts 39 are bevel gears 43 which drive bevel gears 44 on shafts 45, the upper ends of the shafts being provided with bevel gears 46 meshing with bevel gears 47 on the lower ends of vertical shafts 48 which are suitably mounted in bearings carried by the frame members 2ª. Carried by the shafts 48 and adjustable up and down thereon by any suitable means such as set screws, so that they can be fixed at different heights on said shafts, are circular topping cutters 49 placed opposite each other with their edges slightly overlapping. One of the shafts 48 carries a bevel gear 50 (Fig. 3) which drives a bevel gear 51 on a transverse shaft 52 mounted in bearings on frame members 2ª. Carried by the shaft 52 is a sprocket wheel 53. Driven by the sprocket wheel 53 is an endless apron 54 having projections or fingers 55 disposed at intervals of the length thereof, the forward reach of the apron running around an idler sprocket 56 (Fig. 1). The endless adjusting apron 54 is disposed in the same plane or in line with the space 42ª between the brushes 42, but it is considerably wider than that space. Oppositely positioned endless and parallel toothed conveyer chains 58 having toothed projections 59, run around the sprocket wheels 57 on the shafts 48 and idler sprockets 60 carried by shafts journaled in the framework 2ª. The apron 54 is flanked by and runs between longitudinally extending stationary guides 65. The fingers or bristles of the stripping brushes 42 may be made of any suitable material combining flexibility and elasticity with sufficient stiffness to elevate the stalks, and while I preferably use tempered steel wire bristles, I do not limit myself to the use of such bristles.

All of the rotary stripping brushes 42 are adapted to revolve in a direction which will cause them to strip the stalks upwardly and also elevate them; the top-adjusting apron 54 has its lower stretch adapted to travel rearwardly, and the discharge conveyers 58 have their inner stretches adapted to travel rearwardly.

The operation of the machine is as follows: The machine is propelled into the field by the engine 7 and is controlled and guided by the operator occupying an ordinary seat 75 thereon, by manipulating the hand levers 16 and 61 and the steering wheel 63. When harvesting sugar cane, the traction and steering wheels straddle the row and the bifurcated front part of frame 1 is positioned to receive the growing cane, the fingered conveyers 30 guiding the stalks into the machine and to the cutters 28. As previously explained, before the cane is severed, it is engaged by the lower stripping brushes 42 and, consequently, immediately the stalks are cut off at the ground, the upward and rearward rotation of the strippers causes the stalks to be carried upwardly and rearwardly in a substantially erect position with their tops uppermost, and at the same time the wire bristles of the brushes effectually strip off all leaves adhering to the stalks.

The upward and rearward travel of the stalks caused by the rotation of the stripping brushes and by the fact that the stalks are automatically passed from one set of brushes to another pair, eventually brings the tops of the stalks against the lower stretch of the apron 54 whose downwardly projecting arms 55 serve to assist in conveying the tops of the stalks rearwardly. The stalks are prevented from spreading by the guides 65. The topping cutters 49 having been adjusted on their shafts so that they will top the stalks as may be desired, the stalks which are being conveyed upwardly and rearwardly by the brushes 42 and the apron 54, have their tops cut off by said cutters 49. The position of these topping cutters 49 in relation to the cutting knives 28 and to the upward and rearward travel of the stalks is such that the tops of the shortest stalks will reach the apron 54 before encountering the cutters 49 and consequently, all of the stalks, whether long or short, are automatically adjusted to bring their tops into proper relative position, by reason of their encountering the apron 54 which serves as an abutment and because said apron by its travel, combined with the operation of the brushes 42, causes the stalks to be arrested and brought into proper relationship without interference with the rearward travel thereof.

After the tops have been cut off by the cutters 49, the stalks are grasped by the toothed conveyer chains 58 and thereby carried to the extreme rear of the machine and dropped into a cart or receptacle which may be attached to the machine, or onto the ground.

In the provision of the means disclosed herein adapted for arranging or adjusting the stalks of varying lengths so that they may be topped at any desired and uniform distance from their upper ends, I do not restrict myself to the specific means set forth and shown. It is apparent that the severed stalks may first be disposed in any other than a substantially erect position, by throwing them rearwardly or transversely across the machine and that they then be engaged and acted upon by the novel arranging or adjusting means.

Having thus described my invention, what I claim as new and desire to secure by Letters Patent, is:—

1. In a cane stripper, means for stripping the stalks diagonally thereof, in combination with means for directing the stalks in upright position to said stripping means.

2. In a cane stripper, combined rotary strippers and feeders having their axes arranged diagonally to the stalks presented thereto, and thereby adapted to strip the stalks diagonally thereof.

3. In a cane stripper, forwardly and upwardly inclined rotary strippers adapted for stripping the stalks diagonally thereof when said stalks are presented thereto in upright position.

4. In a cane stripper, successive pairs of rotary strippers having their axes arranged diagonally to the stalks when said stalks are presented in upright position, the succeeding pairs being adapted to successively strip the stalks diagonally thereof.

5. In a cane stripper, forwardly and upwardly inclined strippers arranged in substantially parallel pairs substantially one above the other and rotatable upwardly and rearwardly, adapted for stripping the stalks diagonally thereof after severance.

6. In a cane stripper, flexible means for stripping the stalks diagonally thereof, in combination with means for directing the stalks in upright position to said stripping means.

7. In a cane stripper, combined rotary strippers and conveyers having flexible fingers or bristles and having their axes arranged diagonally to the stalks presented thereto, and thereby adapted to strip the stalks diagonally thereof.

8. In a cane stripper, combined strippers and conveyers having flexible fingers or bristles for simultaneously stripping the severed stalks diagonally thereof and conveying them lengthwise and with their tops foremost and also in a general sidewise direction.

9. In a cane stripper, successive pairs of rotary strippers provided with flexible fingers or bristles and having their axes arranged diagonally to the stalks presented thereto and the succeeding pairs adapted to successively strip the stalks diagonally thereof.

10. In a cane stripper, forwardly and upwardly inclined strippers having flexible fingers or bristles and arranged in substantially parallel pairs substantially one above the other and rotatable upwardly and rearwardly, adapted for stripping the stalks diagonally thereof when said stalks are presented thereto in upright position.

11. In a cane stripper, a combined stripper and conveyer adapted for simultaneously stripping the stalks diagonally thereof and conveying them lengthwise and with their tops foremost and also in a general sidewise direction when presented thereto.

12. In a cane stripper, combined rotary strippers and conveyers having their axes arranged diagonally to the stalks presented thereto and thereby adapted to simultaneously strip the stalks diagonally thereof and convey them lengthwise and with their tops foremost and also in a general sidewise direction.

13. In a cane stripper, forwardly and upwardly inclined combined rotary strippers and conveyers rotatable upwardly and rearwardly for simultaneously stripping the stalks diagonally thereof when presented thereto and conveying them upwardly and rearwardly in a substantially erect position with their tops uppermost.

14. In a cane stripper, successive pairs of combined rotary strippers and conveyers having their axes arranged diagonally to the stalks presented thereto, the succeeding pairs being adapted to successively strip the stalks diagonally thereof and simultaneously convey them lengthwise and with their tops foremost and also in a general sidewise direction.

15. In a cane stripper, forwardly and upwardly inclined combined strippers and conveyers arranged in substantially parallel pairs substantially one above the other and rotatable upwardly and rearwardly, adapted for simultaneously stripping the stalks diagonally thereof when presented thereto and conveying them upwardly and rearwardly in a substantially erect position with their tops uppermost.

16. In a cane stripper, combined flexible means for simultaneously stripping the stalks diagonally thereof and conveying them lengthwise of themselves with their tops foremost and also in a general sidewise direction when presented thereto.

17. In a cane stripper, forwardly and upwardly inclined rotary strippers having flexible fingers or bristles adapted for stripping the stalks diagonally thereof.

18. In a cane stripper, combined rotary strippers and conveyers having flexible fingers or bristles and having their axes arranged diagonally to the stalks presented thereto, and thereby adapted to simultaneously strip the stalks diagonally thereof and convey them lengthwise and with their tops forremost and also in a general sidewise direction.

19. In a cane stripper, forwardly and upwardly inclined combined rotary strippers and conveyers having flexible fingers or bristles for simultaneously stripping the stalks diagonally thereof and conveying them upwardly and rearwardly in a substantially erect position with their tops uppermost when presented in upright position thereto.

20. In a cane stripper, successive pairs of combined rotary strippers and conveyers having flexible fingers or bristles and having their axes arranged diagonally to the stalks and the succeeding pairs adapted to successively strip the stalks diagonally thereof and simultaneously convey them lengthwise and with their tops foremost and also in a general sidewise direction when presented in upright position thereto.

21. In a cane stripper, forwardly and upwardly inclined combined strippers and conveyers having flexible fingers or bristles and arranged in substantially parallel pairs substantially one above the other and rotatable upwardly and rearwardly, for simultaneously stripping the stalks diagonally thereof and conveying them upwardly and rearwardly in a substantially erect position with their tops uppermost when presented thereto.

22. In a cane stripper, a combined stripper and conveyer arranged and adapted to engage the stalks before severance and to simultaneously strip the severed stalks diagonally thereof and convey them upwardly and rearwardly in a substantially erect position with their tops uppermost.

23. In a cane stripper, forwardly and upwardly inclined combined rotary strippers and conveyers rotatable upwardly and rearwardly, arranged and adapted to engage the stalks before severance and to simultaneously strip the severed stalks diagonally thereof and convey them upwardly and rearwardly in a substantially erect position with their tops uppermost.

24. In a cane stripper, forwardly and upwardly inclined combined strippers and conveyers arranged in substantially parallel pairs substantially one above the other and rotatable upwardly and rearwardly, and arranged and adapted to engage the stalks before severance and to simultaneously strip the severed stalks diagonally thereof and convey them upwardly and rearwardly in a substantially erect position with their tops uppermost.

25. In a cane stripper, combined flexible means arranged and adapted for engaging the stalks before severance and for simultaneously stripping the several stalks diagonally thereof and conveying them upwardly and rearwardly in a substantially erect position with their tops uppermost.

26. In a cane stripper, combined strippers and conveyers having flexible fingers or bristles, and arranged and adapted to engage the stalks before severance and to simultaneously strip the severed stalks diagonally thereof and convey them upwardly and rearwardly in a substantially erect position with their tops uppermost.

27. In a cane stripper, forwardly and upwardly inclined combined rotary strippers and conveyers having flexible fingers or bristles and rotatable upwardly and rearwardly, arranged and adapted to engage the stalks before severance and to simultaneously strip the severed stalks diagonally thereof and convey them upwardly and rearwardly in a substantially erect position with their tops uppermost.

28. In a cane stripper, forwardly and upwardly inclined combined strippers and conveyers having flexible fingers or bristles and arranged in substantially parallel pairs substantially one above the other and rotatable upwardly and rearwardly, and arranged and adapted to engage the stalks before severance and to simultaneously strip the severed stalks diagonally thereof and convey them upwardly and rearwardly in a substantially erect position with their tops uppermost.

29. In a cane stripper and topper, the combination with means for stripping the stalks, of flexible means for conveying the stalks lengthwise and with their tops foremost and also in a general sidewise direction, a shield or abutment against which the tops of the stalks can be arranged or adjusted for topping, and means for topping the adjusted stalks.

30. In a cane stripper and topper, the combination with means for stripping the stalks, of rotary conveyers having flexible fingers or bristles and having their axes arranged diagonally to the stalks and thereby adapted to convey the stalks lengthwise and with their tops foremost and also in a general sidewise direction, a shield or abutment against which the tops of the stalks can be arranged or adjusted for topping, and means for topping the adjusted stalks.

31. In a cane stripper and topper, combined flexible means for simultaneously stripping the stalks diagonally thereof and conveying them lengthwise and with their tops foremost and also in a general sidewise direction, in combination with a shield or abutment against which the tops of the stalks can be arranged or adjusted for topping, and means for topping the adjusted stalks.

32. In a cane stripper and topper, combined strippers and conveyers having flexible fingers or bristles for simultaneously stripping the stalks diagonally thereof and conveying them lengthwise and with their tops foremost, in combination with a shield or abutment against which the tops of the stalks can be arranged or adjusted for topping, and means for topping the adjusted stalks.

33. In a cane stripper and topper, combined rotary strippers and conveyers having flexible fingers or bristles and having their axes arranged diagonally to the stalks, and thereby adapted to simultaneously strip the stalks diagonally thereof and convey them lengthwise and with their tops foremost and also in a general sidewise direction, in combination with a shield or abutment against which the tops of the severed stalks can be arranged or adjusted for topping, and means for topping the adjusted stalks.

34. In a cane stripper and topper, forwardly and upwardly inclined rotary conveyers and strippers having flexible fingers or bristles for stripping and conveying the severed stalks simultaneously upwardly and rearwardly in a substantially erect position with their tops uppermost, in combination with a shield or abutment against which the tops of the severed stalks can be arranged or adjusted for topping, and means for topping the adjusted stalks.

35. In a cane stripper and topper, rotary conveyers having flexible fingers or bristles and arranged in substantially parallel pairs for stripping and conveying the severed stalks lengthwise with their tops foremost and simultaneously in a general sidewise direction, in combination with a shield or abutment against which the tops of the severed stalks can be arranged or adjusted for topping, and means for topping the adjusted stalks.

36. In a cane stripper and topper, forwardly and upwardly inclined conveyers and strippers having flexible fingers or bristles and arranged in substantially parallel pairs substantially one above the other, and rotatable upwardly and rearwardly for stripping and conveying the stalks simultaneously upwardly and rearwardly in a substantially erect position with their tops uppermost, in combination with a shield or abutment against which the tops of the severed stalks can be arranged or adjusted for topping, and means for topping the adjusted stalks.

37. In a cane stripper and topper, a traveling abutment against which the tops of the stalks can be arranged or adjusted.

38. In a cane stripper and topper, a traveling abutment against which the tops of the stalks can be arranged or adjusted, and means for topping the stalks after they have been adjusted, said abutment being adapted to advance the stalks toward the topping means.

39. In a cane stripper and topper, a traveling abutment against which the tops of the severed stalks can be arranged or adjusted for topping, said abutment having transverse projections at intervals along its length for conveying the tops of the stalks in the direction of its travel, in combination with means for topping the adjusted stalks.

40. In a cane stripper and topper, a traveling abutment against which the tops of the severed stalks can be arranged or adjusted for topping, in combination with guides on either side of said abutment for guiding the tops of the stalks to said abutment.

41. In a cane stripper and topper, a traveling abutment against which the tops of the severed stalks can be arranged or adjusted for topping, in combination with a rotary cutter operable in a plane substantially parallel to said abutment and adapted for adjustment toward or away from said abutment, whereby the tops of the adjusted stalks can be severed at any desired and uniform distance from their upper ends, said abutment being adapted to present the stalks to the cutter.

42. In a cane stripper and topper, forwardly and upwardly inclined combined strippers and conveyers having flexible fingers or bristles and arranged in substantially parallel pairs one above another and rotatable upwardly and rearwardly, arranged for engaging the stalks and for simultaneously stripping them diagonally thereof and conveying them upwardly and rearwardly in a substantially erect position with their tops uppermost, in combination with a movable endless abutment or apron positioned above said combined strippers and conveyers and having a substantially horizontal and rearward travel, against which the tops of the severed stalks can be arranged or adjusted for topping, said abutment or apron having projections at intervals along its length and adapted to convey the tops of the stalks rearwardly, guides on either side of and extending below said abutment or apron and adapted to guide the tops of the stalks from said combined strippers and conveyers to said abutment or apron, and a pair of rotary cutters operable in a plane substantially parallel to and below said abutment or apron and adjustable in their distance therefrom, and thereby adapted to sever the tops of the adjusted stalks at any desired and uniform distance from their upper ends.

43. In a cane stripper and topper, the combination with a traveling abutment adapted to be engaged by and to adjust the tops of the severed stalks, of topping means toward which the said abutment causes the stalks to travel, and rotary combined strippers and conveyers arranged and adapted to present the stalks to the traveling abutment and at the same time to coöperate with the traveling abutment in moving the stalks toward the topping mechanism.

44. In a cane stripper, the combination with means for stripping the stalks, of flexible means for conveying the stalks lengthwise of themselves with their tops foremost and also in a general sidewise direction.

45. In a cane stripper, the combination with means for stripping the stalks, of rotary conveyers provided with flexible fingers or bristles and having their axes arranged diagonally to the stalks and thereby adapted to convey the stalks lengthwise with their tops foremost and also in a general sidewise direction.

In testimony whereof, I hereunto affix my signature in presence of two witnesses.

FRANCIS M. COCKRELL, Jr.

Witnesses:
   EUSTACE L. WILLIAMS,
   ROBERT PRYOR.